United States Patent [19]

Carroll

[11] Patent Number: 5,108,608
[45] Date of Patent: Apr. 28, 1992

[54] CYCLONE SEPARATOR WITH MULTIPLE OUTLETS AND RECYCLING LINE MEANS

[75] Inventor: Noel Carroll, Victoria, Australia

[73] Assignee: Conoco Specialty Products Inc., Houston, Tex.

[21] Appl. No.: 449,834

[22] PCT Filed: Apr. 7, 1989

[86] PCT No.: PCT/AU89/00151
§ 371 Date: Dec. 8, 1989
§ 102(e) Date: Dec. 8, 1989

[87] PCT Pub. No.: WO89/09653
PCT Pub. Date: Oct. 19, 1989

[30] Foreign Application Priority Data
Apr. 8, 1988 [AU] Australia ............... PI7635

[51] Int. Cl.$^5$ .................. B01D 21/26; B04C 3/06
[52] U.S. Cl. .................. 210/512.1; 209/144; 209/211; 210/788
[58] Field of Search ............. 210/512.1, 788; 209/211, 144

[56] References Cited

U.S. PATENT DOCUMENTS

| | | | |
|---|---|---|---|
| 4,576,724 | 3/1986 | Colman et al. | 210/788 |
| 4,578,199 | 3/1986 | Peel et al. | 210/512.1 |
| 4,749,490 | 6/1988 | Smyth et al. | 210/512.1 |
| 4,764,287 | 8/1988 | Colman et al. | 210/512.1 |
| 4,793,924 | 12/1988 | Colman et al. | 210/512.1 |
| 4,810,382 | 3/1989 | Colman et al. | 210/512.1 |
| 4,820,414 | 4/1989 | Carroll et al. | 210/512.1 |
| 4,857,197 | 8/1989 | Young et al. | 209/211 |
| 4,995,989 | 2/1991 | Carroll et al. | 210/512.2 |
| 5,049,277 | 9/1991 | Kalnins | 210/788 |

FOREIGN PATENT DOCUMENTS 1374128  1/1965  France.
2177950  2/1987  United Kingdom.

*Primary Examiner*—Robert A. Dawson
*Assistant Examiner*—Kim: Sun Uk
*Attorney, Agent, or Firm*—John E. Holder

[57] ABSTRACT

A hydrocyclone separator for separating oil and water components of a fluid mixture to provide a more dense water component that is substantially free of oil, having three outlets at the end of the hydrocyclone opposite the inlet end. One of the outlets receives the more dense water component of the mixture. A second of these outlets receives an axial stream of the less dense oil components from the separating chamber. A third outlet is concentrically arranged around the first outlet for the removal of a stream of the oil/water mixture in which one of the components has a presence of the other component which is greater than desired. The stream from this third outlet is then recycled to the inlet end of the separating chamber.

18 Claims, 3 Drawing Sheets

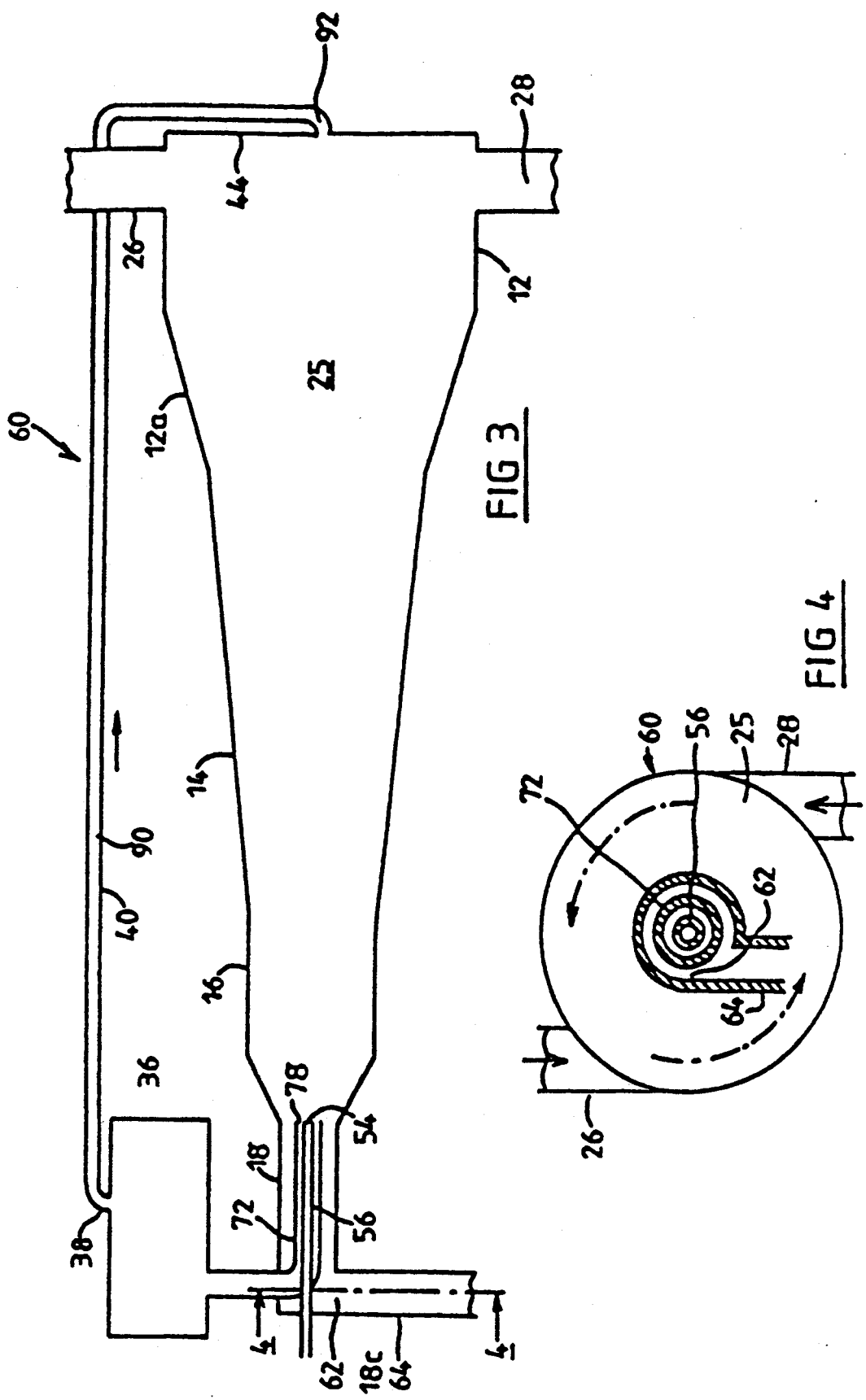

CYCLONE SEPARATOR WITH MULTIPLE OUTLETS AND RECYCLING LINE MEANS

This invention relates to a cyclone separator.

Particularly, the invention is concerned with a cyclone separator having an axially extending elongate separating chamber with inlet means adjacent a first end thereof, for introducing liquid mixture thereinto with a tangential component of motion so that a less dense component of the mixture tends to form a lengthwise extending central core in the separating chamber, said core being surrounded by a more dense component of the mixture, and wherein the separating chamber is so configured as to in use cause the denser component to flow to a first outlet at a second end of the separating chamber opposite said first end.

U.S. Pat. Nos. 4,237,006 and 4,576,724 for example disclose separators of the above kind and wherein there is a further outlet arranged axially of the separator at said first end thereof. In use of a separator of this kind, the less dense component in the mixture, in the central core, is urged to flow axially of the separator to emerge from the separating chamber through the further outlet. The movement of the less dense component towards the further outlet arises because of a pressure differential existing along the central core. However, a difficulty is experienced in operating cyclone separators of this kind in that, under certain conditions, the fluid pressure applied to the central core of the less dense mixture component in the separating chamber is insufficient to at all points along the length thereof drive the less dense mixture component in that core to the further outlet. In that case, the less dense component in the core, at a location towards the first outlet, may tend to be driven out the first outlet with the more dense component thus reducing separating efficiency. This is significant particularly in cases where it is desirable to remove oil from an oily water mixture and where the desired end result is to achieve a clean water flow from the first outlet. In such cases, occurrence of the phenomonen just described may render it impossible under some conditions to obtain a satisfactorily low oil level in the outlet water.

In my International application PCT/AU84/00195, there is described a cyclone separator of the type first above described, and also including the aforementioned further outlet, and also having a third outlet from the separating chamber located towards said second end of the separating chamber to in use receive flow of less dense component from a portion of the core which is located towards the second end of the separating chamber. The received less dense component is that which might be flowing in the core in the direction towards the second end of the separating chamber, instead of towards the further outlet.

It has now been found possible to provide an arrangement in which at least a portion of the less dense component in the aforementioned core is removed from the separating chamber via an outlet positioned as with the aforementioned third outlet, possibly dispensing with the further outlet adjacent the aforementioned first end of the separator, and providing an additional outlet adjacent the third outlet, for take off of portion of the mixture in the separating chamber adjacent the core or at the outer peripheral portion thereof, and for return of this to the separating chamber for further treatment.

More particularly, the invention provides a cyclone separator having an axially extending elongate separating chamber with inlet means adjacent a first end thereof for introducing liquid mixture thereinto with a tangential component of motion so that a less dense component of the mixture tends to form a lengthwise extending central core in the separating chamber, said core being surrounded by a more dense component of the mixture and wherein the separating chamber is so configured as to in use cause the more dense component to flow to a first outlet at a second end of the separating chamber opposite said first end, the separator further including second and third outlets disposed within the separating chamber, the second and third outlets being arranged to receive liquid in use flowing in the separating chamber, in the direction away from said first end, the second outlet being disposed to receive such liquid at a location within the separating chamber close to the axis of the separating chamber, and the third outlet being disposed to receive such liquid so flowing in the separating chamber at a location radially outwardly disposed relative to the radial position of the second outlet. The second and third outlets may be concentrically arranged, the third outlet being, for example, annular.

A recycling line is preferably provided to provide for flow of liquid from the third outlet back to the separating chamber, such as at said first end thereof. The recycling line may be open to the separating chamber axially at said first end.

The separator is preferably characterised by, $$3 \leq \frac{\pi d_i^2}{8 A_i} \leq 30, \text{ or}$$

$$3 \leq \frac{\pi d_i^2}{8 A_i} \leq 20$$

or, if a parameter $d_2$ as described next is defined:

$$3 \leq \frac{\pi d_i d_2}{4 A_i} \leq 30$$

$$3 \leq \frac{\pi d_i d_2}{4 A_i} \leq 20$$

$d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

Usually, the separating chamber is of tapered configuration, being tapered over at least a part thereof and possibly over the whole length thereof, exhibiting a taper angle, the "half angle of conicity", being the angle made between a tangent to the separating chamber surface, viewed in axial section, and the separator axis, at the location where the tangent meets the surface.

In the case where the separating chamber has no substantial part over which the said taper angle is equal to or less than a predetermined small angle, such as 2° or 3°, other than a portion over which this taper angle is substantially zero, the parameter $d_2$ is undefined. Where the chamber, possibly with a part adjacent said one end which has substantially zero taper, has a part over which the taper angle varies from a value greater than the predetermined small angle to a value equal to or less than the predetermined small angle $d_2$ is defined as the diameter of the chamber at the lengthwise location at which the taper angle first becomes so equal to or less than the predetermined small angle i.e., $d_2$ is the diameter of the chamber measured at the point $z_2$ where the condition first applies that:

$$\tan^{-1}\left(\frac{d_2 - d}{2(z - z_2)}\right) \leq 2° \text{ or } \leq 3°$$

for all $z > z_2$ where z is the distance along the cyclone separator axis downstream of the plane containing the inlet means is located (or considered to be located as next described herein if there is more than one inlet) and d is the diameter of the separating chamber at z. Generally, where there are "x" inlets, the point $z = 0$ is the axial position of the weighted areas of the inlets such that the injection of angular momentum into the cyclonic device is equally distributed axially about said axial position where $z = 0$ and being defined by:

$$\frac{1}{A_i d_i} \sum_{x=1}^{x=n} z_x A_{ix} d_{ix} = 0$$

where $z_x$ is the axial position of the $x^{th}$ inlet.

In cases where the separating chamber is cylindrical at the location of the inlets, and where simple tangential inlet means is employed, the term $d_i$ above may be replaced by a term $d_1$ being the diameter of the said separating chamber where flow enters, preferably in an inlet portion at said first end of said separating chamber, (but neglecting any feed channel).

The said portion may be straight sided, or exhibit a variation in taper over its length, such as wherein the aforedescribed taper angle varies from a relatively greater angle at locations towards said larger diameter end of the chamber to a relatively lesser angle at locations towards said smaller diameter end.

In one construction, the tapered portion extends over substantially the whole length of the chamber. In other constructions, the chamber may be provided, adjacent said first end thereof, with an inlet portion into which the or each said inlet extends, the inlet portion being substantially cylindrical.

The second and third outlets may conveniently be formed at the ends of ducts coaxially arranged within the separating chamber adjacent the first outlet, such as coaxially therewithin, and extending from the first outlet a predetermined distance towards the first end of the separating chamber. In order to assist movement of less dense component through the second and/or third outlet, the or each of the second and third outlets may be provided with means for applying a reduced pressure thereat.

The separating chamber may include first, second and third coaxially arranged portions arranged in that order from the first end to the second end of the separating chamber, with the inlet means being provided at the first portion. These portions may be of decreasing cross-sectional size, from the first to the second to the third such portion. These portions may be cylindrical, but not necessarily so. They do not need in all cases to present a side surface which is linear in cross-section or which is parallel to the axis of the separating chamber. The first portion may, however, be cylindrical in one embodiment of the invention, and there may also be a frusto-conical section adjacent the first portion and leading to the second portion, and which provides a taper between the largest diameter of the first portion and the diameter of the second portion at the end thereof closest said first end of the separating chamber. The second portion may itself taper over at least part thereof from a larger diameter adjacent the first portion down to a smaller diameter, for example equal to the diameter of the third portion, at the junction of the second portion with the third portion. Thus, the second portion may exhibit a constant taper over the whole length. A fourth portion may also be added adjacent the third portion, as described in International application PCT/AU83/00028.

The invention is further described by way of example only with reference to the accompanying drawings in which:

FIG. 3 is a diagrammatic axial section of a still further separator constructed in accordance with the invention; and FIG. 4 is a section on the line 4—4 in FIG. 3.

Figure 1:
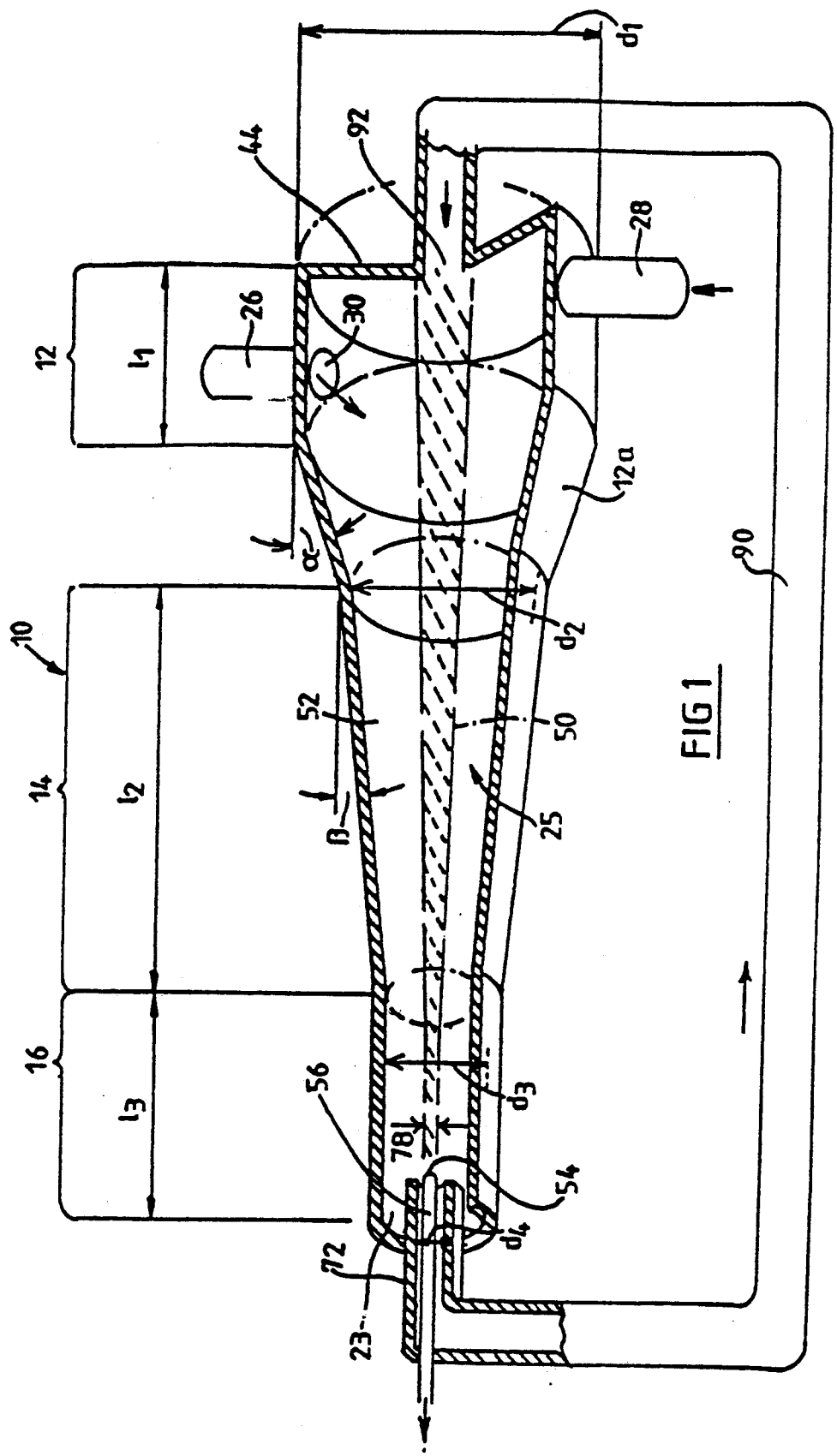
FIG. 1 is a cutaway perspective view of a cylone separator constructed in accordance with the present invention.

The separator 10 shown in FIG. 1 has a separating chamber 25 in the form of an elongate generally tapered surface of revolution defined about a lengthwise extending axis of the separator. The separating chamber has first second and third portions 12, 14, and 16, coaxially arranged in that order from the first or largest diameter end of the separating chamber, at which portion 12 is located, to the second or smaller diameter end of the separating chamber, at which end portion 16 is located. These portions are generally similar to corresponding first, second and third portions of the separating chamber of the cyclone separators described in U.S. Pat. Nos. 4,237,006 and 4,576,724, the disclosures of which are hereby incorporated into the present specification to form and part thereof. The first portion 12 is of generally cylindrical form and has two feed pipes 26, 28 associated therewith, these being arranged to feed tangentially into the portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14.

In the arrangements of the last mentioned United States patents, there is an axial overflow outlet at the larger diameter end of the separating chamber, but this is not provided in the arrangement shown in FIG. 1.

A tapered part 12a of the separating chamber is positioned between the second portion 14 and the portion 12, although such tapered part is not essential.

The second portion 14 exhibits a taper over its length, tapering from a diameter, at the end adjacent part 12a, equal to the diameter of part 12a to a somewhat lesser dimension at its opposite end. Portion 16 is of constant diameter, equal to the minimum diameter of portion 14.

In the figure, parameters such as the length $l_1$ of portion 12, its diameter $d_1$, the taper angle $\alpha$ of the tapered part 12a (i.e., the half angle of conicity thereof) the length and diameter $l_2$, $d_2$ of the second portion 14, the taper angle $\beta$ of the second portion 14 and the length $l_3$ and diameter $d_3$ of the third portion as well as total area $A_i$ of the two feed inlet apertures 30 may all be selected in accordance with parameters mentioned in the aforementioned United States patent specifications, such as follows:

$$10 \leq l_2/d_2 \leq 25$$

$$0.04 \leq 4A_i/\pi d_1^2 \leq 0.10.$$

or $$4A_i/\pi d_i^2 < 0.10$$

$$d_1 > d_2$$

$$d_2 > d_3$$

However, not all of these parameters need necessarily be so constrained.

A mentioned in the specification of International patent application PCT/AU83/00028, a frusto-conical or otherwise shaped portion, (not shown) may be added to the separating chamber 25 at the smaller diameter end of the separating chamber, such as at the remote end of portion 16, but this is not essential.

An underflow outlet 23 from the separating chamber 25 is defined at the end of separating chamber portion 16 which is remote from the larger diameter end of the separating chamber. There are further provided, positioned within portion 16 and extending thereinto through outlet 23, two coaxial pipe-like ducts 56, 72 which are likewise coaxial with the axis of the separator. These extend to respective concentric second and third outlets 54, 78 positioned within portion 16. Thus the outer periphery of the duct 56 is radially spaced from the inner periphery of the duct 72, whilst the outer periphery of the duct 72 is radially spaced from the inner periphery of the portion 16 of the separator. Of the two ducts 56, 72, the larger diameter duct, duct 72, communicates externally of the separating chamber 25 with a return line or duct 90 which opens to the interior of chamber 25 at an axial inlet 92 in an end wall 44 of the separating chamber at the larger diameter end thereof.

The smaller diameter duct 56 extends exterially of the separator, such as through a side wall of the duct 90.

In use, a liquid to be separated is admitted tangentially to the interior of portion 12 via the feed pipes 26, 28, the more dense component of the liquid then travelling lengthwise, in spiral fashion, adjacent the peripheral wall of the separating chamber 25 through the separating chamber to emerge from outlet 23.

As shown, the less dense component tends to form a central tapered core designated by reference numeral 50, this being surrounded by the more dense component, within the chamber 25, this more dense component being designated by reference numeral 52. As shown, core 50 is widest at the larger diameter end of the separator and, generally, the flow of the lighter component therewithin is directed axially of the separator in the direction toward the smaller diameter end of the separating chamber.

Outlet 54 is designed to receive, and transmit exterially of the separator through duct 56, the less dense component of the liquid mixture within the core 50.

The outlet 78, which is of annular form, is designed and sized so as to receive liquid from the interior of the separating chamber at around the location of the boundary between the core 50 and the more dense surrounding liquid component. This liquid may have therewithin a proportion of the more dense component of a liquid mixture which proportion, although somewhat reduced by centrifical action may not result in the less dense component being as free of the more dense component as is desired. The liquid admitted to duct 72 via outlet 78 is transmitted through duct 72 and 90 and returned to the separating chamber 25 at the inlet 92, for mixing with the liquid in the separating chamber 25 and for reprocessing within the separating chamber.

Figure 2:
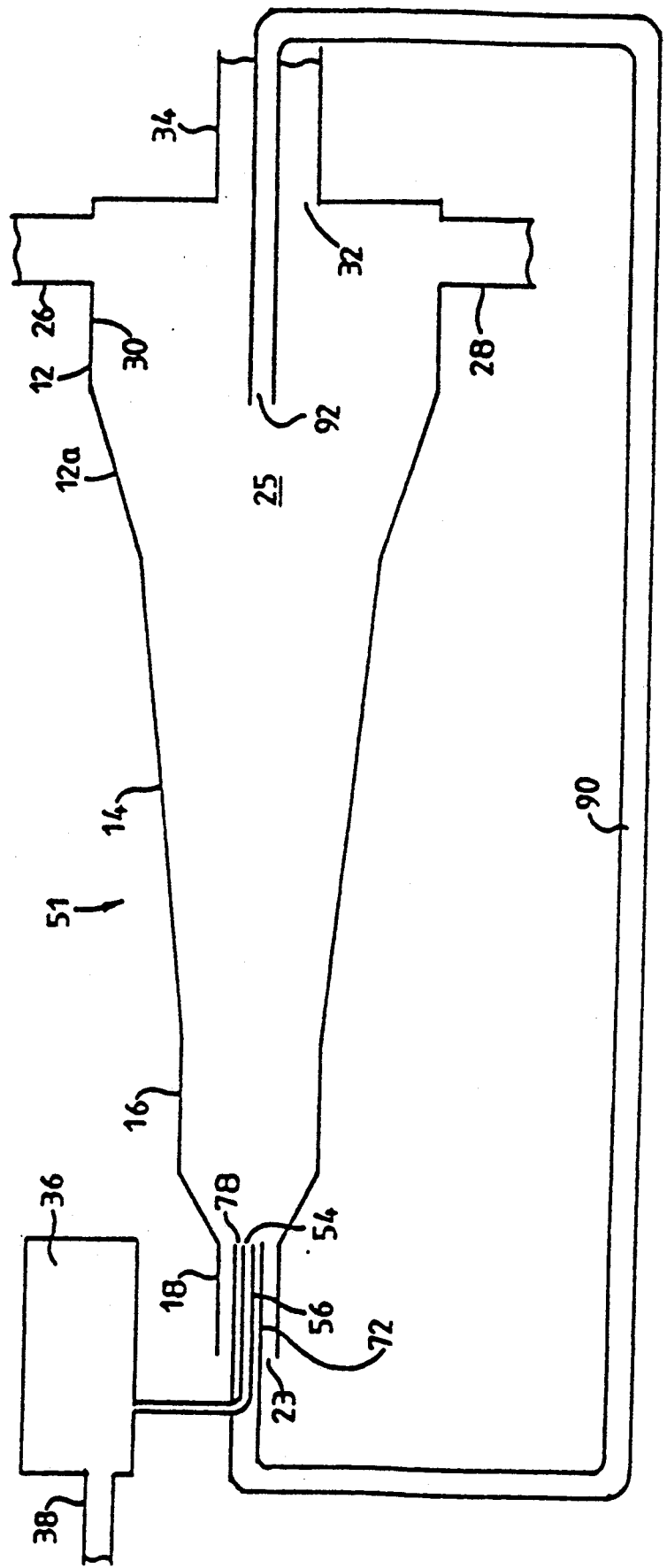
FIG. 2 is a diagrammatic axial section of a further cyclone separator constructed in accordance with the invention.

FIG. 2 shows a separator 51 like that in FIG. 1 save that, here, the duct 56 is connected, at an end exterior to the separating chamber 25, to a positive displacement vacuum pump 36 to apply a reduced pressure to the interior of the duct 56 and thus to the outlet 54, to facilitate flow of less dense component through the duct 56. Liquid so flowing is expressed from the outlet 38 of the pump. In this case, too, the separating chamber 25 is provided with an additional fourth portion 18 at the end portion 16, in accordance with the teachings with the aforementioned International application PCT/AU83/00028 and, in this instance, the ducts 72 and 56 are positioned within portion 18.

Also shown in FIG. 2 is an axial overflow outlet opening 32 which communicates with an axial overflow outlet pipe 34. The overfow outlet 32 may receive a certain proportion of the less dense mixture component for direction from core 50 outwardly through pipe 34. Duct 90 is shown in this instance as extending concentrically within pipe 34 and thence axially through opening 32 some distance into the separating chamber. The opening 32 and pipe 34 may however be omitted.

In FIG. 3, a still further, similar, separator 60 is shown wherein pump 36 is provided, in this instance, to provide a reduced pressure within duct 72 and thus at outlet 78. In this case, the outlet 38 of the pump 36 communicates via duct 90 with inlet 92. In this case, too, the sepatator 60 is somewhat modified in that the portion 18 of the separating chamber terminates in a closed wall 18c, with the underflow outlet from the separator being provided as an opening 62 to a tangential outlet duct 64 arranged to receive the helical flow of the liquid in separating chamber 25, rather than being provided as an axial opening 23 as in the case of the separator of FIG. 1. The helical flow of the more dense liquid flowing within the separating chamber, as applied to the mixture components component in the separator, arises because of the tangential positioning of the inlet pipes 26, 28.

The described arrangements may be further modified. For example, International application PCT/AU85/00166 describes an arrangement having only a single inlet instead of the two inlets as provided in the described arrangements. Such an inlet, of involute or like form, may be provided in the present instance.

Also, the described separator comprises three distinct portions 12, 14, 16 as above described, possibly with an additional portion 18 also as described. Further portions may also be added. It is not essential, however that the separator be so characterised. Generally speaking, the separating chamber should principally be characterised in that, $$3 \leq \frac{\pi d_i^2}{8A_i} \leq 30, \text{ or}$$

$$3 \leq \frac{\pi d_i^2}{8A_i} \leq 20$$

or, if a parameter $d_2$ as described next is defined:

$$3 \leq \frac{\pi d_i d_2}{4A_i} \leq 30, \text{ or}$$

$$3 \leq \frac{\pi d_i d_2}{4A_i} \leq 20$$

$d_{ix}$ is twice the radius at which flow enters the cyclone through the $x^{th}$ inlet (i.e., twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

In the case where the separating chamber has no substantial part over which the said taper angle is equal to or less than a predetermined small angle such as 2° or 3°, other than a portion over which this taper angle is substantially zero, the parameter $d_2$ is undefined. Where the chamber, possibly with a part adjacent said one end which has substantially zero taper, has a part over which the taper angle varies from a value greater than the predetermined small angle to a value equal to or less than the predetermined small angle, $d_2$ is defined as the diameter of the chamber at the lengthwise location at which the taper angle first becomes so equal to or less than the predetermined small angle i.e., $d_2$ is the diammeter of the chamber measured at the point $z_2$ where the condition first applies that $$\tan^{-1}\left(\frac{d_2 - d}{2(z - z_2)}\right) \leq 2° \text{ or } \leq 3°$$

for all $z > z_2$ where $z$ is the distance along the cyclone separator axis downstream of the plane containing the inlet means is located (or considered to be located as next described herein if there is more that one inlet) and $d$ is the diameter of the separating chamber at $z$. Generally, where there are "x" inlets, the point $z=0$ is the axial position of the weighted areas of the inlets such that the injection of angular momentum into the cyclonic device is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

In cases where the separating chamber is cylindrical at the location of the inlets, and where simple tangential inlet means is employed, the term $d_i$ above may be replaced by a term $d_l$ being the diameter of the said separating chamber where flow enters, preferably in an inlet portion at said one end of said separating chamber, (but neglecting any feed channel).

The said portion may be straight sided, or exhibit a variation in taper over its length, such as wherein the aforedescribed taper angle varies from a relatively greater angle at locations towards said larger diameter end of the chamber to a relatively lesser angle at locations towards said smaller diameter end.

In one construction, the tapered portion extends over substantially the whole length of the chamber. In other constructions, the chamber may be provided, adjacent said larger diameter end thereof, with an inlet portion into which the or each said inlet extends, the inlet portion being substantially cylindrical.

The described construction has been advance merely by way of explanation and many modifications and variations may be made thereto without departing from the spirit and scope of the invention as defined in the appended claims.

I claim:

1. A cyclone separator having an axially extending elongate separating chamber with inlet means adjacent a first end thereof for introducing liquid mixture thereinto with a tangential component of motion so that a less dense component of the mixture tends to form a lengthwise extending central core in the separating chamber, said core being surrounded by a more dense component of the mixture and wherein the separating chamber is so configured as to in use cause the more dense component to flow to a first outlet at a second end of the separating chamber opposite said first end, the separator further including second and third outlets disposed within the separating chamber, the second and third outlets being arranged to receive liquid flowing in the separating chamber, in the direction away from said first end, the second outlet being disposed to receive such liquid at a location within the separating chamber close to the axis of the separating chamber, and the third outlet being disposed to receive such liquid so flowing in the separating chamber at a location radially outwardly disposed relative to the radial position of the second outlet; and recycling line means for providing a flow of liquid from the third outlet back to said separating chamber, said recycling line means being open to the separating chamber at said first end.

2. A cyclone separator as claimed in claim 1, wherein the second and third outlets are formed in the ends of ducts coaxially arranged within the separating chamber adjacent the first outlet, and extending from the first outlet a predetermined distance towards the first end of the separating chamber.

3. A cyclone separator as claimed in claim 2 wherein, in order to assist movement of less dense component through the second and/or third outlet, the or each of the second and third outlets is provided with means for applying a reduced pressure thereat.

4. A cyclone separator as claim in claim 1, wherein the separating chamber includes first, second and third coaxially arranged portions arranged in that order from the first end to the second end of the separating chamber, with the inlet means being provided at the first portion.

5. A cyclone separator as claimed in claim 4 wherein said portions are of decreasing cross-sectional size, from the first to the second to the third such portion.

6. A cyclone separator as claimed in claim 5 wherein a flow smoothing tapered part is positioned between said first and second portions, and said second portions tapers from the end adjacent said tapered part to the end adjacent the third portion.

7. A cyclone separator as claimed in claim 6 wherein said first portion is cylindrical.

8. A cyclone separator as claimed in claim 1 wherein said separator is characterized by:

$$3 \leq \frac{\pi d_i^2}{8 A_i} \leq 20$$

wherein $$d_i = \frac{1}{A_i} \sum_{x=1}^{x=n} d_{ix} A_{ix}$$

where $d_{ix}$ is twice the radius at which flow enters the cyclone through the $x^{th}$ (i.e. twice the minimum distance of the tangential component of the inlet centre line from the axis), and $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

9. A cyclone separator as claimed in claim 1 wherein said separator is characterized by:

$$3 \leq \frac{\pi d_i^2}{8 A_i} \leq 30$$

wherein $$d_i = \frac{1}{A_i} \sum_{x=1}^{x=n} d_{ix} A_{ix}$$

where $d_{ix}$ is twice the radius at which flow enters the cyclone through the $x^{th}$ inlet (i.e. twice the minimum distance of the tangential component of the inlet centre line from the axis), and $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

10. A cyclone separator as claimed in claim 1 wherein said separating chamber has a part over which the taper angle varies from a value greater than a predetermined small angle to a value to a value equal to or less than the predetermined small angle and $$3 \leq \frac{\pi d_i d_2}{4 A_i} \leq 30$$

where $$d_i = \frac{1}{A_i} \sum_{x=1}^{x=n} d_{ix} A_{ix}$$

where $d_{ix}$ is twice the radius at which flow enters the cyclone through the $x^{th}$ inlet (i.e. twice the minimum distance of the tangential component of the inlet centre line from the axis), and $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

and $d_2$ is diameter of the chamber measured at the point $z_2$ where the condition first applies that $$\tan^{-1} \frac{d_2 - d}{2(z - z_2)} \leq n.$$

where n is small angle, for all $z > z_2$ where z is the distance along the cyclone separator axis from the point $z=0$ and d is the diameter of the cyclonic device at z, point $z=0$ being the axial position of the weighted areas of the inlets such that the injection of angular momentum into the cyclonic device is equally distributed axially about said axial position where $z=0$ and being defined by:

$$\frac{1}{A_i d_i} \sum_{x=1}^{x=n} z_x A_{ix} d_{ix} = 0$$

where z is the axial position of the $x^{th}$ inlet.

11. A cyclone separator as claimed in claim 1 wherein said separating chamber has a part over which taper angle varies from a value greater than a predetermined small angle to a value equal to or less than the predetermined small angle and $$3 \leq \frac{\pi d_i d_2}{4 A_i} \leq 30$$

where $$d_i = \frac{1}{A_i} \sum_{x=1}^{x=n} d_{ix} A_{ix}$$

where $d_{ix}$ is twice the radius at which flow enters the cyclone through the $x^{th}$ inlet (i.e, twice the minimum distance of the tangential component of the inlet centre line from the axis), and $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where:

$$A_i = \sum_{x=1}^{x=n} A_{ix}$$

and $d_2$ is the diameter of the chamber measured at the point $z_2$ where the condition first applies that $$\tan^{-1} \frac{d_2 - d}{2(z - z_2)} \leq n,$$

where n is said small angle, for all $z > z_2$ where z is the distance along the cyclone separator axis from the point $z=0$ and d is the diameter of the cyclonic device at z, point $z=0$ being the axial position of the weighted areas of the inlets such that the injection of angular momentum into the cyclonic device is equally distributed axially about said axial position where $z=0$ and being defined by:

$$\frac{1}{A_i d_i} \sum_{x=1}^{x=n} z_x A_{ix} d_{ix} = 0$$

where $z_x$ is the axial position of the $x^{th}$ inlet.

12. A cyclone separator as claimed in claim 10 or claim 14 wherein angle "n" is 2°.

13. A cyclone separator as claimed in claim 10 or 11 where "n" is 3°.

14. The cyclone separator of claim 1 and further including a fourth outlet at said first end of said separating chamber for receiving a portion of the less dense component of the mixture.

15. The cyclone separator of claim 14 wherein said fourth outlet is axially arranged at said first end of said separating chamber.

16. A separation system for separating oil and water components of a fluid mixture wherein it is desired to ultimately provide a more dense water component that is substantially free of a less dense oil component comprising;
a hydrocyclone designed, constructed and arranged to effect separation of the less dense oil component from the more dense water component of the fluid mixture,
said hydrocyclone having an elongated separating chamber with an inlet means at a first end of the separating chamber for inlet of the fluid mixture to be separated,
said separation chamber being so configured as to in use cause the more dense water component to flow to a first outlet means at a second end of the separating chamber opposite said first end, for outlet of the more dense water component of the mixture, second outlet means also located at said second end of said separating chamber for outlet of a less dense oil component of the mixture,
said hydrocyclone further having third outlet means at said second end and annularly positioned between said first and second outlet means for capturing a liquid component which is principally comprised of a mixture of said oil and water components wherein one of said components has a presence of the other component which is greater than desired;
fluid passage means for returning the liquid component captured by said third outlet means to the first end of said separating chamber.

17. The separation system of claim 16 and further including a return inlet means axially positioned at the first end of said separating chamber.

18. The separation system of claim 16 and further including a fourth outlet means at said first end of said separating chamber for also outletting a portion of said less component of the mixture.

* * * * *